(12) United States Patent
Kaneko et al.

(10) Patent No.: US 11,781,516 B2
(45) Date of Patent: Oct. 10, 2023

(54) STARTING SYSTEM FOR INTERNAL COMBUSTION ENGINE AND LAWNMOWER INCLUDING SAME

(71) Applicant: HONDA MOTOR CO., LTD., Tokyo (JP)

(72) Inventors: Norio Kaneko, Saitama (JP); Akihiro Kimura, Saitama (JP); Takashi Hashizume, Saitama (JP); Daisuke Nojiri, Saitama (JP); Koji Kuriyagawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/763,855

(22) PCT Filed: Oct. 2, 2019

(86) PCT No.: PCT/JP2019/038894
§ 371 (c)(1),
(2) Date: Mar. 25, 2022

(87) PCT Pub. No.: WO2021/064889
PCT Pub. Date: Apr. 8, 2021

(65) Prior Publication Data
US 2022/0333569 A1   Oct. 20, 2022

(51) Int. Cl.
*F02N 11/00* (2006.01)
*F02N 11/08* (2006.01)
*A01D 101/00* (2006.01)

(52) U.S. Cl.
CPC ...... *F02N 11/0811* (2013.01); *F02N 11/0862* (2013.01); *A01D 2101/00* (2013.01); *F02N 2200/064* (2013.01); *F02N 2200/14* (2013.01)

(58) Field of Classification Search
CPC .............. F02N 11/0811; F02N 11/0862; F02N 11/0818; F02N 11/0844; F02N 2200/064;
(Continued)

(56) References Cited

U.S. PATENT DOCUMENTS

| 4,731,601 A | * | 3/1988 | Nowakowski | ..... G01R 31/3647 340/439 |
| 5,332,958 A | * | 7/1994 | Sloan | .................... H02J 7/0047 320/136 |

(Continued)

FOREIGN PATENT DOCUMENTS

| CN | 104093952 A | 10/2014 |
| EP | 1580424 A2 | 9/2005 |

(Continued)

OTHER PUBLICATIONS

Notice of Reasons for Refusal for Japanese Patent Application No. 2021-572680 dated Oct. 18, 2022; 10 pp.
(Continued)

*Primary Examiner* — Phutthiwat Wongwian
*Assistant Examiner* — Sherman D Manley
(74) *Attorney, Agent, or Firm* — Armstrong Teasdale LLP

(57) ABSTRACT

To prolong a lifetime of a starter battery, a starting system (5) for an internal combustion engine (3) includes: a starter battery (22) constituted of a lithium-ion battery and configured to supply electric power to a starter motor (21); and a controller (51) configured to drive the starter motor (21) by the electric power from the starter battery (22) to perform cranking operations of the engine (3) intermittently, wherein the controller (51) is configured to prohibit the cranking operations for a first time interval before the cranking operations are performed a prescribed number of times within a prescribed time window, and to prohibit the cranking operations for a second time interval longer than the first
(Continued)

time interval right after the cranking operations are performed the prescribed number of times within the prescribed time window.

8 Claims, 5 Drawing Sheets

(58) Field of Classification Search
CPC .. F02N 2200/14; A01D 2101/00; Y02T 10/40
See application file for complete search history.

(56) References Cited

U.S. PATENT DOCUMENTS

| | | | | |
|---|---|---|---|---|
| 5,798,577 | A * | 8/1998 | Lesesky | F02N 11/08 307/10.6 |
| 6,465,908 | B1 * | 10/2002 | Karuppana | H02J 4/00 307/31 |
| 6,497,209 | B1 * | 12/2002 | Karuppana | F02N 11/10 290/38 R |
| 7,216,616 | B2 * | 5/2007 | Asada | F02N 11/0803 307/10.3 |
| 7,407,464 | B2 * | 8/2008 | Tanioka | B60R 25/04 477/203 |
| 8,171,907 | B2 * | 5/2012 | Koenen | B60K 28/04 200/341 |
| 9,624,890 | B2 * | 4/2017 | Koenen | F02N 11/0811 |
| 2005/0247280 | A1 * | 11/2005 | Asada | F02N 11/101 307/10.3 |
| 2006/0091729 | A1 | 5/2006 | Kamiya et al. | |
| 2006/0200292 | A1 * | 9/2006 | Asakage | F02D 17/04 701/50 |
| 2014/0366830 | A1 | 12/2014 | Kawano et al. | |
| 2018/0351383 | A1 | 12/2018 | Zeiler et al. | |

FOREIGN PATENT DOCUMENTS

| | | |
|---|---|---|
| JP | 2002303233 A | 10/2002 |
| JP | 2005273615 A | 10/2005 |
| JP | 2006105083 A | 4/2006 |
| JP | 2017002819 A | 1/2017 |
| JP | 2018087529 A | 6/2018 |
| WO | 2016065128 A1 | 4/2016 |

OTHER PUBLICATIONS

International Search Report for Patent Application PCT/JP2019/038894 dated Nov. 29, 2019; 3 pp.
Office Action for Chinese Patent Application No. 201980100954.0 dated Jul. 21, 2023; 12 pp.

* cited by examiner

STARTING SYSTEM FOR INTERNAL COMBUSTION ENGINE AND LAWNMOWER INCLUDING SAME

CROSS-REFERENCE TO RELATED APPLICATION

This application is a U.S. National Phase Application of PCT/JP2019/038894 filed Oct. 2, 2019, which is hereby expressly incorporated by reference in its entirety.

TECHNICAL FIELD

The present invention relates to a starting system for an internal combustion engine and a lawnmower including the same.

BACKGROUND ART

A starting system for an internal combustion engine used for a common product is operated manually or electrically. In an electrically-operated starting system, a starter motor is driven by electric power from a starter battery to perform a cranking operation, thereby starting the engine.

As a starter battery for an electrically-operated starting system, a lead-acid battery, which is reasonable and durable, is widely used. However, the lead-acid battery is large and heavy, so that the layout of the starter battery in a product may be limited if the lead-acid battery is used as the starter battery.

Considering such a circumstance, in recent years, a lithium-ion battery starts to be used as the starter battery for an electrically-operated starting system. The lithium-ion battery is smaller and lighter than the lead-acid battery, and therefore the flexibility of the layout of the starter battery in a product can be improved by using the lithium-ion battery as the starter battery. Also, the lithium-ion battery has a long lifetime and a superior nature that its self-consuming electric current is small. Thereby, the starter battery is being switched from the lead-acid battery to the lithium-ion battery.

However, the lithium-ion battery is generally more expensive than the lead-acid battery. Thereby, if the starter battery, which is constituted of the lithium-ion battery, needs to be exchanged due to a malfunction thereof, a monetary burden of a user of a product may increase. One of the reasons for the malfunction thereof is that excessive electric current flows from the starter battery to the starter motor and therefore an excessive load is applied to the starter battery, as the starter motor is driven in a state where it is difficult to start the engine.

In view of such a situation, there is a starting system for an engine provided with a protection circuit against an excessive electric current to prevent an excessive electric current from flowing from the starter battery to the starter motor (see, Japanese Unexamined Patent Application Publication No. 2018-87529).

However, even in a case where a starting system for an engine is provided with such a protection circuit against an excessive electric current, if the starter motor is frequently driven in a state where it is difficult to start the engine, loads are frequently applied to the starter battery, so that damages are rapidly accumulated in the starter battery. As a result, the starter battery may deteriorate rapidly to shorten a lifetime of the starter battery.

In view of such a problem of the prior art, a primary object of the present invention is to provide a starting system for an internal combustion engine that can reduce the frequency with which loads are applied to the starter battery to prolong a lifetime of the starter battery.

SUMMARY OF INVENTION

To achieve such an object, one embodiment of the present invention provides a starting system (5) for an internal combustion engine (3), including: a starter switch (45) configured to accept a starting operation of the engine; a starter motor (21) configured to start the engine; a starter battery (22) constituted of a lithium-ion battery and configured to supply electric power to the starter motor; and a controller (51) configured to drive the starter motor by the electric power from the starter battery to perform cranking operations of the engine intermittently in response to the starting operation of the engine, wherein the controller is configured to prohibit the cranking operations for a first time interval (I1) before the cranking operations are performed a prescribed number of times within a prescribed time window, and to prohibit the cranking operations for a second time interval (I2) longer than the first time interval right after the cranking operations are performed the prescribed number of times within the prescribed time window.

According to this arrangement, the frequency with which loads are applied to the starter battery can be reduced, so that an increase of a cumulative damage to the starter battery can be suppressed. Therefore, a deterioration speed of the starter battery can be lowered to prolong a lifetime of the starter battery.

Preferably, the controller is configured to reset the number of times of the cranking operations in a case where the engine has started by one of the cranking operations or in a case where the cranking operations are performed the prescribed number of times within the prescribed time window.

According to this arrangement, the number of times of the cranking operations can be reset at an appropriate timing. Therefore, an unnecessary increase of the second time interval can be suppressed so that a waiting time of a user can be shortened.

Preferably, the starting system further includes: a power line (38) connecting the starter motor to the starter battery; an electric component (23) provided on the power line; and a temperature sensor (33) configured to detect a temperature of one of the starter battery and the electric component, wherein the controller is configured to prohibit the cranking operations in a case where the temperature of the one of the starter battery and the electric component detected by the temperature sensor is higher than a prescribed standard temperature after the first time interval or the second time interval.

According to this arrangement, it is possible to prevent the cranking operations from being performed again in a state where the temperature of the starter battery or the electric component is high. Therefore, a deterioration speed of the starter battery can become even lower to further prolong a lifetime of the starter battery.

Preferably, the starting system further includes: a power line connecting the starter motor to the starter battery; and an electric component provided on the power line; wherein the controller is configured to change the prescribed number of times according to the conditions of the starter battery and the electric component.

According to this arrangement, the prescribed number of times can be optimized according to the conditions of the starter battery and the electric component.

Preferably, the starting system further includes: a power line connecting the starter motor to the starter battery; and an electric component provided on the power line; wherein the controller is configured to change duration of the cranking operation according to the conditions of the starter battery and the electric component.

According to this arrangement, duration of the cranking operation can be optimized according to the conditions of the starter battery and the electric component.

Preferably, the starting system further includes: a power line connecting the starter motor to the starter battery; and an electric component provided on the power line; wherein the controller is configured to change at least one of the first time interval and the second time interval according to the conditions of the starter battery and the electric component.

According to this arrangement, the first time interval or the second time interval can be optimized according to the conditions of the starter battery and the electric component.

Preferably, the starting system further includes a notification unit (46) configured to notify a user of a suspension of the cranking operations when the cranking operations are performed the prescribed number of times within the prescribed time window.

According to this arrangement, a user can realize that the cranking operations are suspended due to the second time interval so that the starting system for the engine becomes more convenient.

Preferably, the starting system further includes an operation unit (46) configured to accept changing operations of the prescribed number of times, the first time interval, and the second time interval within prescribed changing ranges.

According to this arrangement, a user can change the prescribed number of times and the like according to his/her liking so that the starting system for the engine becomes more convenient. Also, since changing ranges are set for the prescribed number of times and the like, it is possible to prevent a user from excessively changing the prescribed number of times and the like.

Another embodiment of the present invention provides a lawnmower (1) including the starting system.

According to this arrangement, it is possible to provide a lawnmower that can prolong a lifetime of a starter battery.

DESCRIPTION OF EMBODIMENTS

Lawnmower 1

Figure 1:
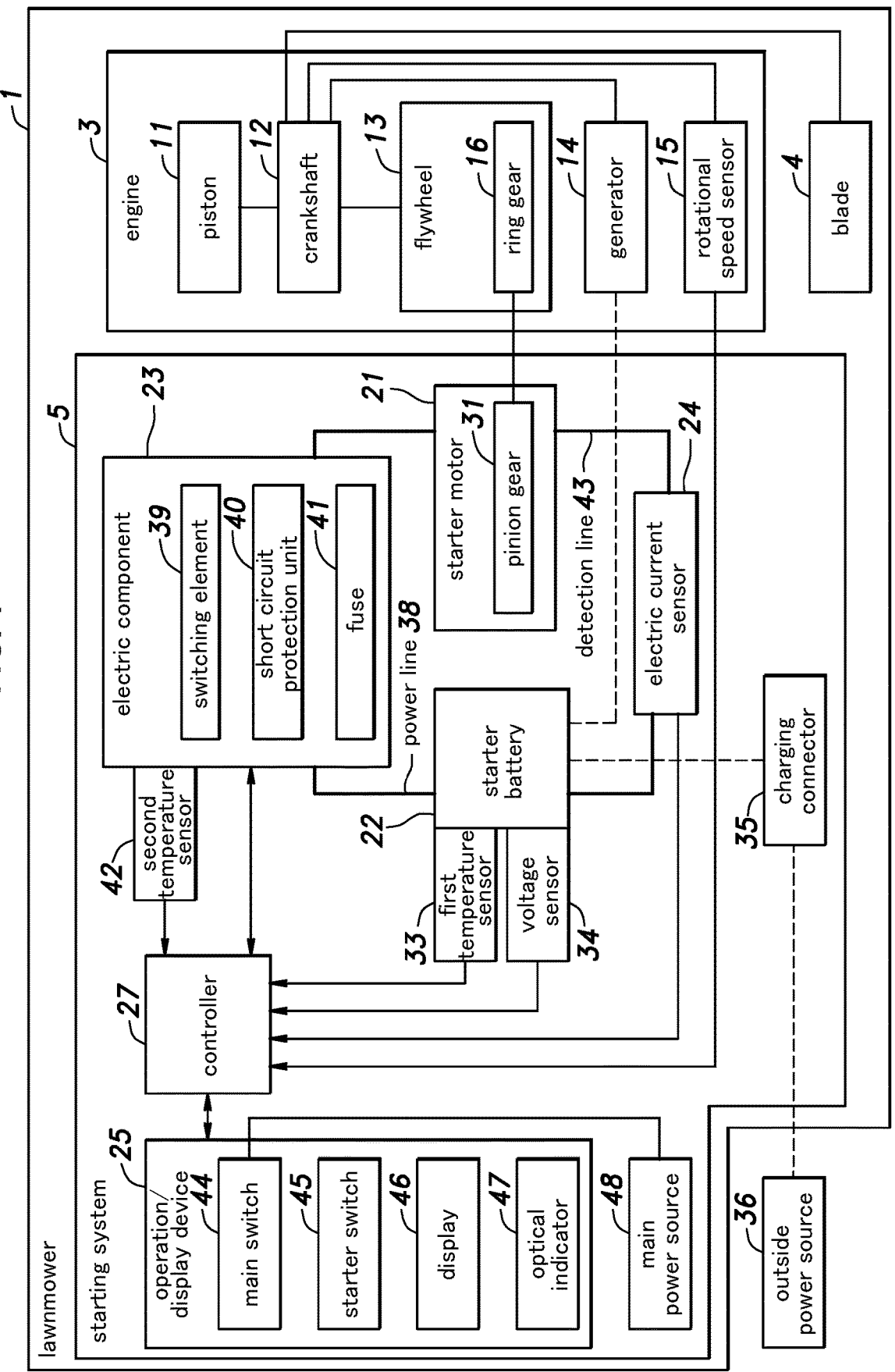
FIG. 1 is a block diagram showing a lawnmower according to an embodiment of the present invention.

First, with reference to FIG. 1, a configuration of a lawnmower 1 (an example of a power equipment) according to one embodiment of the present invention will be described. The lawnmower 1 is, for example, a self-traveling device that travels by a driving force of a traveling motor (not shown). In other embodiments, the lawnmower 1 may be a hand-pushed device that travels while being pushed by a user.

The lawnmower 1 includes an internal combustion engine (hereinafter referred to as "the engine 3") that generates a driving force, a blade 4 (an example of a working unit) that is rotated by the driving force of the engine 3, and a starting system 5 that starts the engine 3. The following describes each component of the lawnmower 1.

Engine 3

The engine 3 includes a piston 11 that can reciprocate, a crankshaft 12 that can be rotated in response to the reciprocation of the piston 11, a flywheel 13 that is fixed to the crankshaft 12, a generator 14 that generates AC power in response to a rotation of the crankshaft 12, and a rotational speed sensor 15 that detects a rotational speed X of the crankshaft 12 (hereinafter referred to as "the rotational speed X of the engine 3"). The crankshaft 12 extends along a vertical direction. The flywheel 13 includes a ring gear 16.

Blade 4

The blade 4 is fixedly connected to the lower end of the crankshaft 12. That is, the blade 4 is connected to the crankshaft 12 without a clutch. Therefore, compared with a case where the blade 4 is connected to the crankshaft 12 via a clutch, the configuration of the lawnmower 1 can be simplified. The blade 4 is always rotated in sync with the crankshaft 12. When the blade 4 is rotated, a lawn is mowed by the blade 4.

Starting System 5

The starting system 5 includes a starter motor 21, a starter battery 22, an electric component 23, an electric current sensor 24, an operation/display device 25, and a controller 27. The following describes each component of the starting system 5.

The starter motor 21 includes a pinion gear 31. The pinion gear 31 is movable between a protruding position where the pinion gear 31 meshes with the ring gear 16 of the flywheel 13 and a retracting position where the pinion gear 31 does not mesh with the ring gear 16 of the flywheel 13.

The starter battery 22 is constituted of a lithium-ion battery. The lithium-ion battery is smaller and lighter than a lead-acid battery. Therefore, flexibility of a layout of the starter battery 22 in the lawnmower 1 can be improved by using the lithium-ion battery as the starter battery 22.

A first temperature sensor 33 is attached to the starter battery 22. The first temperature sensor 33 detects a temperature of the starter battery 22. A voltage sensor 34 is attached to the starter battery 22. The voltage sensor 34 detects a voltage of the starter battery 22.

The starter battery 22 is connected to the generator 14 via a processing circuit (not shown), and the AC power generated by the generator 14 is converted into DC power by the processing circuit to be supplied to the starter battery 22. Thereby, the starter battery 22 is charged by the generator 14. The starter battery 22 is connected to a charging connector 35 that can be connected to an outside power source 36. When the outside power source 36 is connected to the charging connector 35, the outside power source 36 and the starter battery 22 are connected via the charging connector 35. Thereby, the starter battery 22 is charged by the outside power source 36. As described above, the starter battery 22 is chargeable by both of the generator 14 and the outside power source 36. Therefore, even if the remaining charge of the starter battery 22 is reduced to the extent that it is difficult to drive the starter motor 21, the remaining charge of the starter battery 22 can be restored to the extent that it is possible to drive the starter motor 21 by charging the starter battery 22 by the outside power source 36.

The electric component 23 is provided on a power line 38 that connects the starter motor 21 to the starter battery 22. The electric component 23 includes a switching element 39, a short circuit protection unit 40, and a fuse 41. The switching element 39 is constituted of a Field Effect Transistor (FET), for example. The short circuit protection unit 40 detects a short circuit of the power line 38 to cut off an electric current flowing through the power line 38 or to limit the electric current flowing through the power line 38 to a prescribed limit value or less.

A second temperature sensor 42 is attached to the electric component 23. The second temperature sensor 42 detects a temperature of the electric component 23. The second temperature sensor 42 detects a temperature of the switching element 39, for example. In other embodiments, the second temperature sensor 42 may detect a temperature of the short circuit protection unit 40 or the fuse 41.

The electric current sensor 24 is constituted of a resistance, for example. The electric current sensor 24 is provided on a detection line 43 that connects the starter motor 21 to the starter battery 22. The electric current sensor 24 detects an electric current (hereinafter referred to as "the discharging electric current") flowing from the starter battery 22 to the starter motor 21 when the starter battery 22 discharges.

The operation/display device 25 includes a main switch 44, a starter switch 45, a display 46 (an example of a notification unit and an operation unit), and an optical indicator 47. The main switch 44 is a switch that accepts a power-on operation of a main power source 48 by a user. The starter switch 45 is a switch that accepts a starting operation of the engine 3 by a user. The display 46 is constituted of a liquid crystal panel, for example. The optical indicator 47 is constituted of an LED, for example, and can be kept on and blink.

The controller 27 is constituted of a microcomputer mounted on the starter battery 22, for example. The controller 27 is connected to the rotational speed sensor 15, the electric current sensor 24, the first temperature sensor 33, the voltage sensor 34, and the second temperature sensor 42, and receives signals from these sensors. The controller 27 is connected to the electric component 23 and sends/receives a signal to/from the electric component 23. The controller 27 is connected to the operation/display device 25 and sends/receives a signal to/from the operation/display device 25.

Cranking Operation

When the starter switch 45 accepts the starting operation of the engine 3 by a user, a starting signal is sent from the starter switch 45 to the controller 27. When the controller 27 receives the starting signal from the starter switch 45, the controller 27 sends a switching signal to the switching element 39 to switch the switching element 39 from OFF to ON. Accordingly, electric power is supplied from the starter battery 22 to the starter motor 21, and the starter motor 21 is driven by the electric power from the starter battery 22. When the starter motor 21 is driven in this way, the pinion gear 31 of the starter motor 21 moves from the retracting position to the protruding position to mesh with the ring gear 16 of the flywheel 13. In this way, the cranking operation is started in response to the switching signal from the controller 27.

When the cranking operation is performed under a condition where the blade 4 is not locked (for example, a condition where the blade 4 is not clogged with the lawn), the flywheel 13 and the crankshaft 12 rotate together by the driving force of the starter motor 21. Along with this, the engine 3 can be started. On the other hand, when the cranking operation is performed under a condition where the blade 4 is locked (for example, a condition where the blade 4 is clogged with the lawn), the flywheel 13 and the crankshaft 12 cannot be rotated by the driving force of the starter motor 21. Therefore, the engine 3 cannot be started.

First Example of Engine Starting Control

Figure 2:
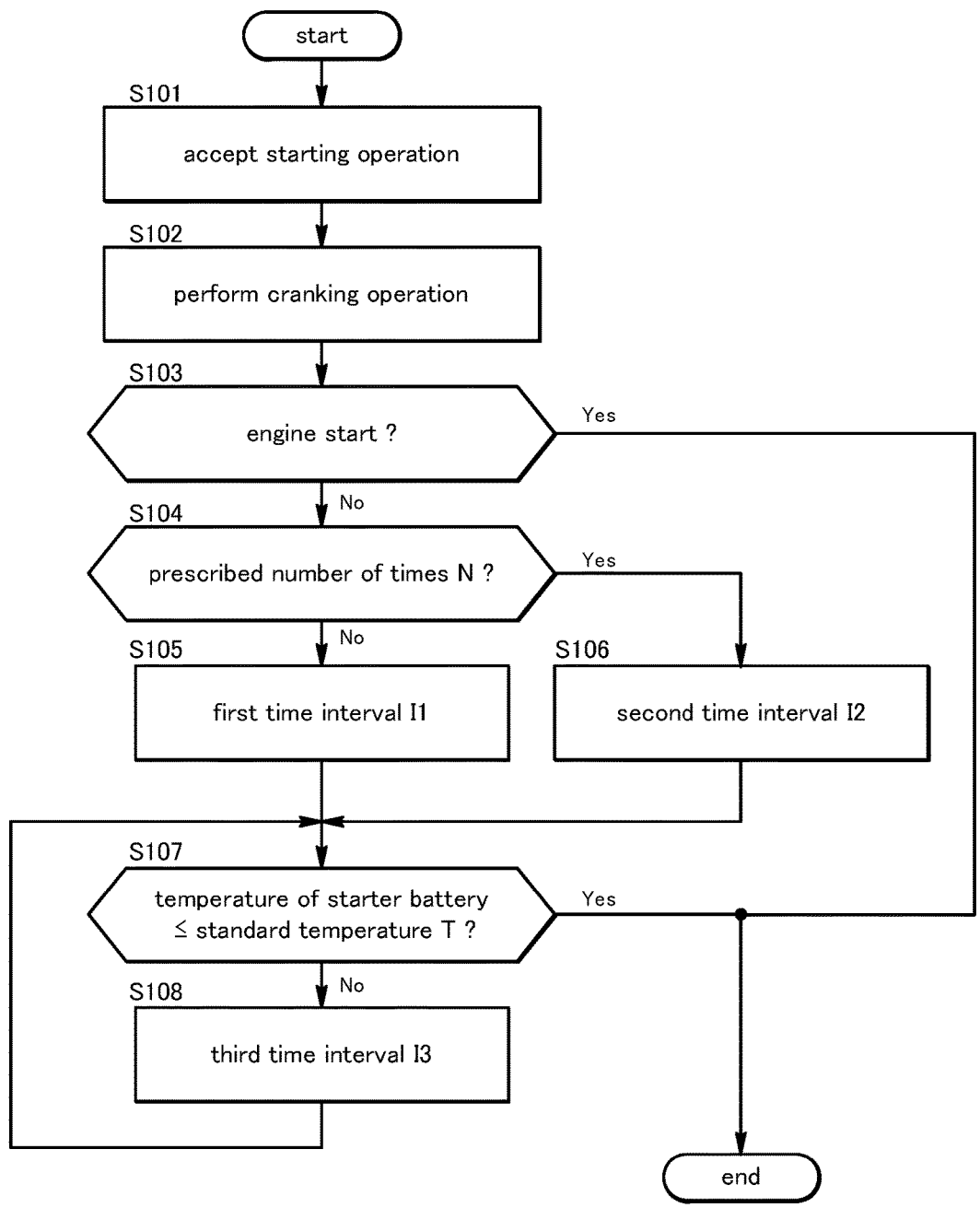
FIG. 2 is a flow chart showing a first example of engine starting control.

Next, with reference to FIG. 2, a first example of engine starting control will be described.

First, the starter switch 45 accepts the starting operation of the engine 3 by a user (step S101). Along with this, the starting signal is sent from the starter switch 45 to the controller 27.

When the controller 27 receives the starting signal from the starter switch 45, the controller 27 performs the cranking operation for a prescribed duration P (step S102). The duration P of the cranking operation is one second, for example.

Next, the controller 27 determines whether the engine 3 has started (step S103). For example, the controller 27 determines that the engine 3 has started when the rotational speed X of the engine 3 detected by the rotational speed sensor 15 is equal to or greater than a prescribed reference rotational speed S, and the controller 27 determines that the engine 3 has not started when the rotational speed X of the engine 3 detected by the rotational speed sensor 15 is not equal to or greater than the reference rotational speed S.

In a case where a determination in step S103 is Yes a case where the engine 3 has started), the controller 27 resets a number of times of the cranking operations and ends the engine starting control.

On the other hand, in a case where the determination in step S103 is No (in a case where the engine 3 has not started), the controller 27 determines whether the cranking operations are performed a prescribed number of times N within a prescribed time window Q (step S104). The prescribed number of times N is several times, for example.

In a case where a determination in step S104 is No (in a case where the cranking operations are not performed the prescribed number of times N within the time window Q), the controller 27 prohibits the cranking operations for a first time interval I1 (step S105). The first time interval I1 is several seconds, for example, and is longer than the duration P of the cranking operations.

On the other hand, in a case where the determination in step S104 is Yes (in a case where the cranking operations are performed the prescribed number of times N within the time window Q), the controller 27 resets the number of times of the cranking operations and prohibits the cranking operations for a second time interval I2 (step S106). The second time interval I2 is one minute, for example, and is sufficiently longer than the first time interval I1.

When step S105 (the first time interval I1) or step S106 (the second time interval I2) is finished, the controller 27 determines whether the temperature of the starter battery 22 detected by the first temperature sensor 33 is equal to or lower than a prescribed standard temperature T (step S107).

In a case where a determination in Step S107 is No (in a case where the temperature of the starter battery 22 is higher than the standard temperature T), the controller 27 prohibits the cranking operations for a third time interval I3 (step S108), and makes the determination in step S107 again.

On the other hand, in a case where the determination in step S107 is Yes (in a case where the temperature of the starter battery 22 is equal to or lower than the standard temperature T), the controller 27 ends the engine starting control. Thereafter, when the starter switch 45 accepts the starting operation of the engine 3 by the user (step S101), the engine starting control is resumed. This allows the controller 27 to perform the cranking operation again.

In the first example of the engine starting control, every time the controller 27 receives the starting signal from the starter switch 45, the controller 27 performs the cranking operation only once. On the other hand, in other embodiments of the engine starting control, every time the controller 27 receives the starting signal from the starter switch 45, the controller 27 may perform the cranking operations the prescribed number of times N.

Figure 3:
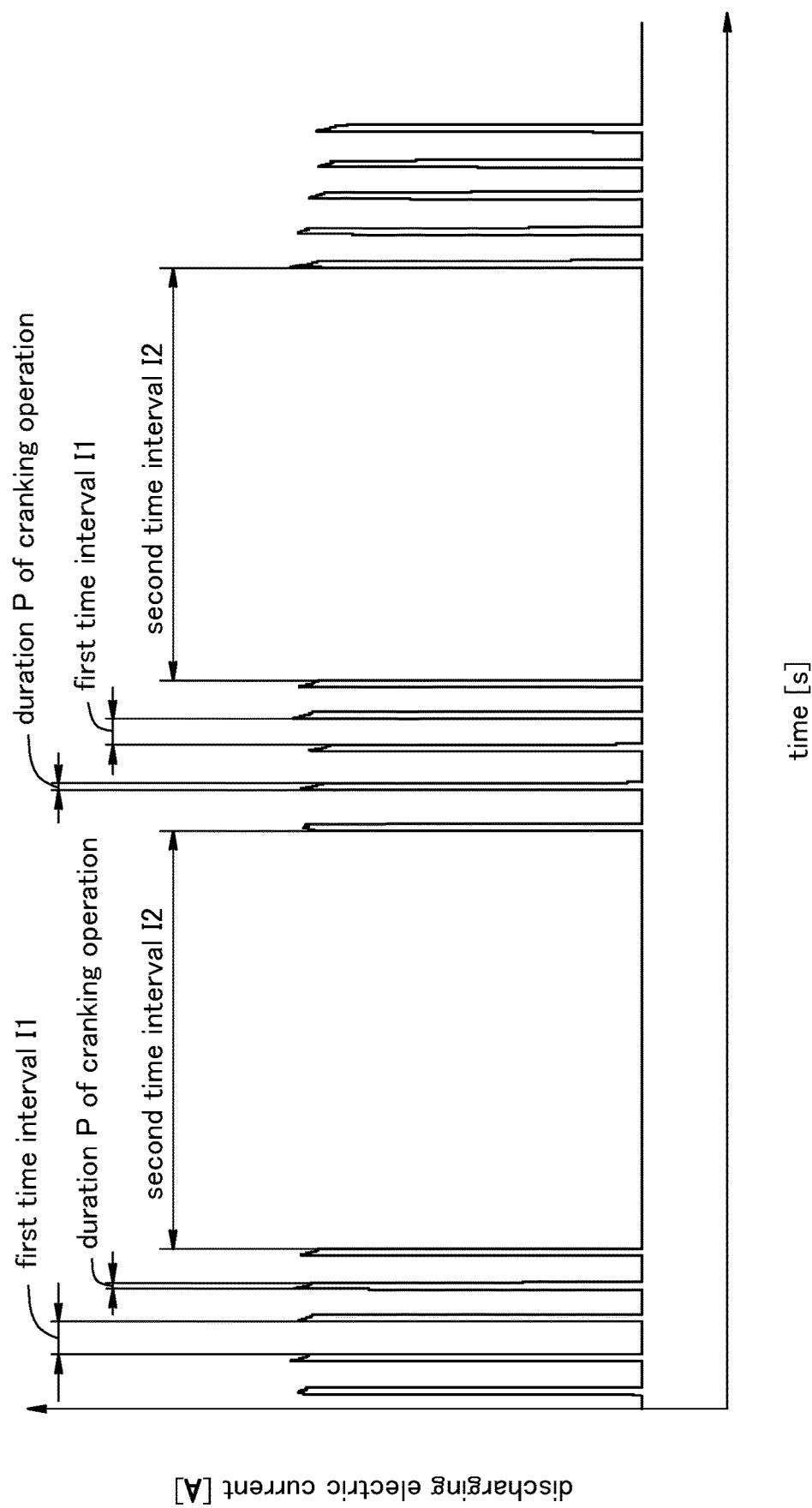
FIG. 3 is a graph showing a change of a discharging electric current in the first example of the engine starting control.

FIG. 3 shows a change of a discharging electric current in the first example of the engine starting control. The periods at which the discharging electric current is rising indicate the durations P of the cranking operations.

As shown in FIG. 3, the controller 27 performs the cranking operations intermittently. Also, the controller 27 prohibits the cranking operations for the first time interval I1 before the cranking operations are performed the prescribed number of times N (five times in FIG. 3) the time window Q, and the controller 27 prohibits the cranking operations for the second time interval I2 longer than the first time interval I1 right after the cranking operations are performed the prescribed number of times N within the time window Q. Thereby, the frequency with which loads are applied to the starter battery 22 and the electric component 23 can be reduced, so that increases of cumulative damages to the starter battery 22 and the electric component 23 can be suppressed. Therefore, deterioration speeds of the starter battery 22 and the electric component 23 can be lowered to prolong lifetimes of the starter battery 22 and the electric component 23.

Also, by setting the second time interval I2 right after the cranking operations are performed the prescribed number of times N within the time window Q, it is possible to prevent the temperatures of the starter battery 22 and the electric component 23 from rising. Along with this, it is not necessary to install a large number of the electric components 23 in parallel with each other to prevent the temperatures of the starter battery 22 and the electric component 23 from rising. Therefore, the manufacturing cost of the starting system 5 can be reduced.

Also, in the first example of the engine starting control, the controller 27 resets the number of times of the cranking operations in a case where the engine 3 has started by one of the cranking operations or in the case where the cranking operations are performed the prescribed number of times N within the time window Q. Thereby, the number of times of the cranking operations can be reset at an appropriate timing. Therefore, an unnecessary increase of the second time interval I2 can be suppressed so that a waiting time of a user can be shortened.

Also, in the first example of the engine starting control, the controller 27 prohibits the cranking operations in a case where the temperature of the starter battery 22 detected by the first temperature sensor 33 is higher than the standard temperature T after the first time interval I1 or the second time interval I2. Therefore, it is possible to prevent the cranking operations from being performed again in a state where the temperature of the starter battery 22 is high. Thereby, a deterioration speed of the starter battery 22 can become even lower to further prolong a lifetime of the starter battery 22. In other embodiments, the controller 27 may prohibit the cranking operations in a case where the temperature of the electric component 23 detected by the second temperature sensor 42 is higher than the standard temperature T after the first time interval I1 or the second time interval I2.

Preferably, in the first example of the engine starting control, the display 46 displays a notification screen which notifies the user of a suspension of the cranking operations, in the case where the cranking operations are performed the prescribed number of times N within the time window Q. Thereby, the user can realize that the cranking operations are suspended due to the second time interval I2 so that the starting system 5 becomes more convenient. In other embodiments, instead of displaying the notification screen by the display 46, the optical indicator 47 may be kept on or blink to notify the user of the suspension of the cranking operations. Alternatively, a handle (not shown) held by the user may be displaced or vibrated to notify the user of the suspension of the cranking operations. Alternatively, a voice may notify the user of the suspension of the cranking operations.

Preferably, in the first example of the engine starting control, the display 46 accepts changing operations of the prescribed number of times N, the first time interval I1, and the second time interval I2 within prescribed changing ranges. Thereby, the user can change the prescribed number of times N and the like according to his/her liking so that the starting system 5 becomes more convenient. Also, since changing ranges are set for the prescribed number of times N and the like, it is possible to prevent the user from excessively changing the prescribed number of times N and the like. In other embodiments, an operation device (for example, a switch) other than the display 46 may accept changing operations of the prescribed number of times N, the first time interval I1, and the second time interval I2.

Second Example of Engine Starting Control

Figure 4:
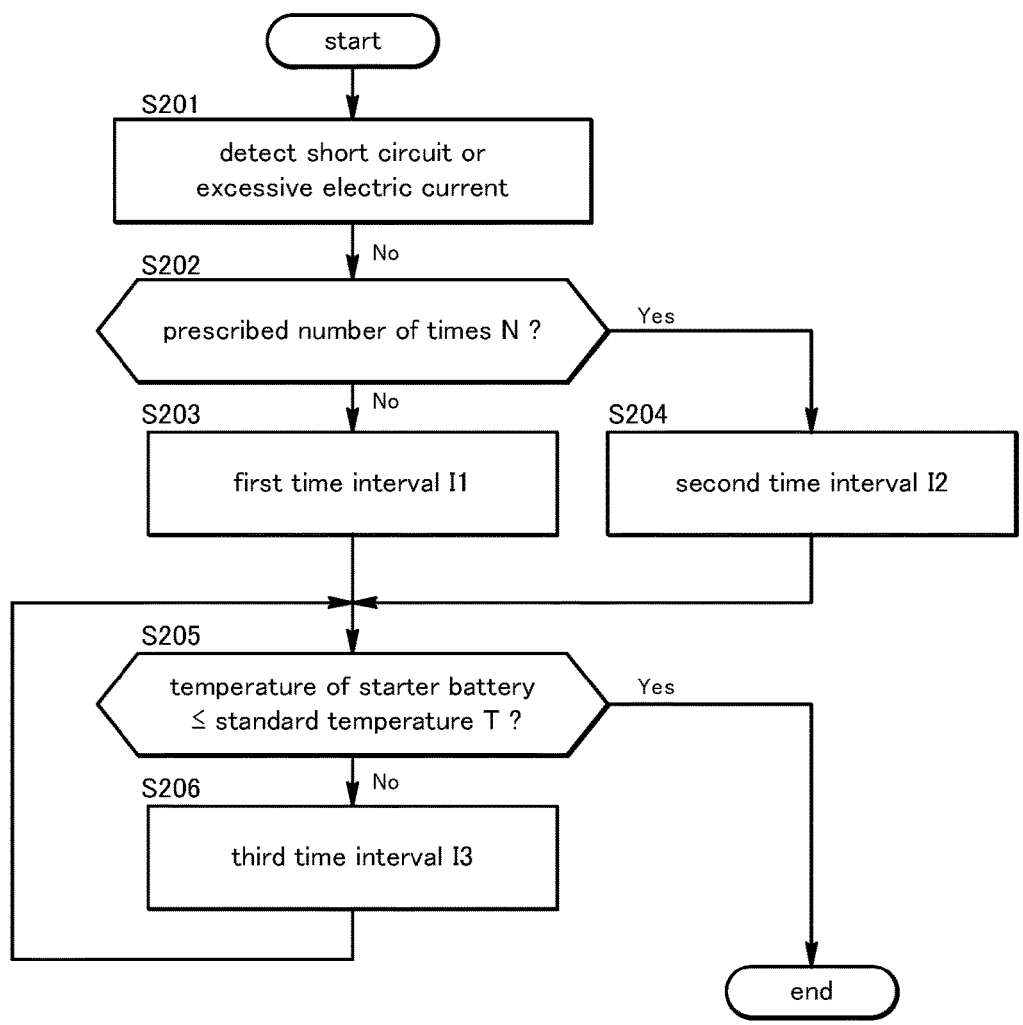
FIG. 4 is a flow chart showing a second example of the engine starting control.

Next, with reference to FIG. 4, a second example of the engine starting control will be described. The duplicate descriptions that have already been given in the first example of the engine starting control will be omitted.

First, the short circuit protection unit 40 detects the short circuit of the power line 38 or the electric current sensor 24 detects an excessive electric current (the discharging electric current equal to or greater than a prescribed threshold value) (step S201). Along with this, a short circuit signal is sent from the short circuit protection unit 40 to the controller 27 or an excessive electric current signal is sent from the electric current sensor 24 to the controller 27.

When the controller 27 receives the short circuit signal from the short circuit protection unit 40 or the excessive electric current signal from the electric current sensor 24, the controller 27 determines whether the short circuit of the power line 38 or the excessive electric current is detected a prescribed number of times N within a prescribed time window Q (step S202).

In a case where a determination in step S202 is No (in a case where the short circuit of the power line 38 or the excessive electric current is not detected a prescribed number of times N within a prescribed time window Q), the controller 27 prohibits the cranking operations for a first time interval I1 (step S203).

On the other hand, in a case where the determination in step S202 is Yes (in a case where the short circuit of the power line 38 or the excessive electric current is detected a prescribed number of times N within a prescribed time window Q), the controller 27 prohibits the cranking operations for a second time interval I2 longer than the first time interval I1 (step S204).

Since steps S205 and S206 of the second example of the engine starting control are the same as steps S107 and S108 of the first example of the engine starting control, descriptions therefor are omitted.

In a case where the blade 4 is locked (for example, in a case where the blade 4 is clogged with the lawn), the short circuit of the power line 38 or the excessive electric current is detected every time the controller 27 performs the cranking operations. Therefore, in the case Where the blade 4 is locked, the number of times of the cranking operations accords with a detecting number of times of the short circuit of the power line 38 or a detecting number of times of the excessive electric current. Accordingly, the change of the discharging electric current in the second example of the engine starting control is the same as the change of the discharging electric current in the first example of the engine starting control (see FIG. 3). Therefore, in the second example of the engine starting control, similar to the first example of the engine starting control, the controller 27 prohibits the cranking operations for the first time interval I1 before the cranking operations are performed the prescribed number of times N within the time window Q, and the controller 27 prohibits the cranking operations for the second time interval I2 longer than the first time interval I1 right after the cranking operations are performed the prescribed number of times N within the time window Q.

Setting Control of the Duration P of the Cranking Operation

Figure 5:
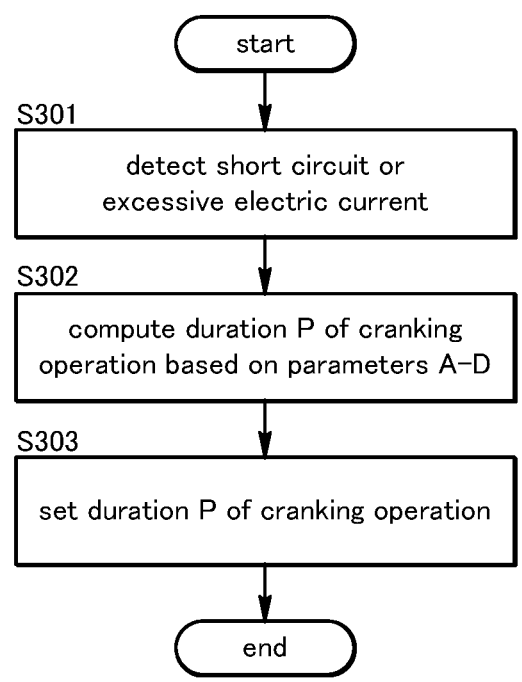
FIG. 5 is a flow chart showing setting control of a duration of a cranking operation.

Next, with reference to FIG. 5, setting control of the duration P of the cranking operation will be described.

First, the short circuit protection unit 40 detects the short circuit of the power line 38 or the electric current sensor 24 detects the excessive electric current (step S301). Along with this, the short circuit signal is sent from the short circuit protection unit 40 to the controller 27 or the excessive electric current signal is sent from the electric current sensor 24 to the controller 27.

When the controller 27 receives the short circuit signal from the short circuit protection unit 40 or the excessive electric current signal from the electric current sensor 24, the controller 27 computes the duration P of the cranking operation based on the following parameters A to D (step S302).

parameter A: the discharging electric current
parameter B: the cumulative value of the discharging electric current
parameter C: the temperature of the starter battery 22 and the temperature of the electric component 23
parameter D: the deterioration degree of the starter battery 22

The controller 27 obtains the above "parameter A: the discharging electric current" based on a signal from the electric current sensor 24. For example, the controller 27 shortens the duration P of the cranking operation as the discharging electric current increases.

The controller 27 computes the above "parameter B: the cumulative value of the discharging electric current" by accumulating the discharging electric current from a prescribed initial time. The initial time may be, for example, the time when use of the lawnmower 1 is started or the time when the main switch 44 accepts the power-on operation of the main power source 48. For example, the controller 27 shortens the duration P of the cranking operation as the cumulative value of the discharging electric current increases.

The controller 27 obtains the above "parameter C: the temperature of the starter battery 22 and the temperature of the electric component 23" based on signals from the first temperature sensor 33 and the second temperature sensor 42. For example, the controller 27 shortens the duration P of the cranking operation as the temperature of the starter battery 22 and the temperature of the electric component 23 increase.

For example, the controller 27 determines the above "parameter D: the deterioration degree of the starter battery 22" based on a usage history (a number of times of past charges/discharges) of the starter battery 22 or the voltage of the starter battery 22. For example, the controller 27 determines that the deterioration degree of the starter battery 22 becomes higher as the usage history of the starter battery 22 is larger. Alternatively, the controller 27 determines that the deterioration degree of the starter battery 22 is higher as the voltage of the starter battery 22 at full charge is lower. For example, the controller 27 shortens the duration P of the cranking operation as the deterioration degree of the starter battery 22 becomes higher.

Next, the controller 27 sets the duration P of the cranking operation computed in step S302 as the duration P of the cranking operation of the next time (step S303), and ends the setting control of the duration P of the cranking operation.

In this way, the controller 27 changes the duration P of the cranking operation according to the conditions of the starter battery 22 and the electric component 23. Therefore, the duration P of the cranking operation can be optimized according to the conditions of the starter battery 22 and the electric component 23.

In other embodiments, the controller 27 may change the prescribed number of times N according to the conditions of the starter battery 22 and the electric component 23. For example, the controller 27 decreases the prescribed number of times N as the temperature of the starter battery 22 and the temperature of the electric component 23 increase. For example, the controller 27 decreases the prescribed number of times N as the discharging electric current increases. For example, the controller 27 decreases the prescribed number of times N as the cumulative value of the discharging electric current increases. For example, the controller 27 decreases the prescribed number of times N as the deterioration degree of the starter battery 22 increases.

In other embodiments, the controller 27 may change at least one of the first time interval I1 and the second time interval I2 according to the conditions of the starter battery 22 and the electric component 23. For example, the controller 27 lengthens the first time interval I1 and the second time interval I2 as the discharging electric current increases. For example, the controller 27 lengthens the first time interval I1 and the second time interval I2 as the cumulative value of the discharging electric current increases. For example, the controller 27 lengthens the first time interval I1 and the second time interval I2 as the deterioration degree of the starter battery 22 increases.

LIST OF THE NUMERALS 1 lawnmower
3 engine
5 starting system
21 starter motor
22 starter battery
23 electric component
27 controller
38 power line
45 starter switch
46 display
11 first time interval
12 second time interval

The invention claimed is:

1. A starting system for an internal combustion engine, comprising:
- a starter switch configured to accept a starting operation of the engine;
- a starter motor configured to start the engine;
- a starter battery constituted of a lithium-ion battery and configured to supply electric power to the starter motor;
- a power line connecting the starter motor to the starter battery;
- an electric component provided on the power line;
- a temperature sensor configured to detect a temperature of one of the starter battery and the electric component; and
- a controller configured to drive the starter motor by the electric power from the starter battery to perform cranking operations of the engine intermittently in response to the starting operation of the engine,
- wherein the controller is configured to prohibit the cranking operations for a first time interval before the cranking operations are performed a prescribed number of times within a prescribed time window, and to prohibit the cranking operations for a second time interval longer than the first time interval right after the cranking operations are performed the prescribed number of times within the prescribed time window,
- wherein the controller is configured to prohibit the cranking operations in a case where the temperature of the one of the starter battery and the electric component detected by the temperature sensor is higher than a prescribed standard temperature after the first time interval or the second time interval.

2. The starting system according to claim 1, wherein the controller is configured to reset the prescribed number of times of the cranking operations in a case where the engine has started by one of the cranking operations or in a case where the cranking operations are performed the prescribed number of times within the prescribed time window.

3. The starting system according to claim 1,
wherein the controller is configured to change the prescribed number of times according to the conditions of the starter battery and the electric component.

4. The starting system according to claim 1,
wherein the controller is configured to change duration of the cranking operation according to the conditions of the starter battery and the electric component.

5. The starting system according to claim 1,
wherein the controller is configured to change at least one of the first time interval and the second time interval according to the conditions of the starter battery and the electric component.

6. The starting system according to claim 1, further comprising a notification unit configured to notify a user of a suspension of the cranking operations when the cranking operations are performed the prescribed number of times within the prescribed time window.

7. The starting system according to claim 1, further comprising an operation unit configured to accept changing operations of the prescribed number of times, the first time interval, and the second time interval within prescribed changing ranges.

8. A lawnmower comprising the starting system according to claim 1.

* * * * *